(12) United States Patent
Lu

(10) Patent No.: US 12,062,247 B2
(45) Date of Patent: Aug. 13, 2024

(54) TOUCH PANEL WITH FINGERPRINT IDENTIFICATION FUNCTION AND MANUFACTURING METHOD THEREOF

(71) Applicant: MIYABI TECHNOLOGY CO., LTD., New Taipei (TW)

(72) Inventor: Tsung-Yi Lu, New Taipei (TW)

(73) Assignee: MIYABI TECHNOLOGY CO., LTD., New Taipei (TW)

( * ) Notice: Subject to any disclaimer, the term of this patent is extended or adjusted under 35 U.S.C. 154(b) by 227 days.

(21) Appl. No.: 17/884,079

(22) Filed: Aug. 9, 2022

(65) Prior Publication Data
US 2023/0245490 A1 Aug. 3, 2023

Related U.S. Application Data

(60) Provisional application No. 63/304,362, filed on Jan. 28, 2022.

(51) Int. Cl.
*G06V 40/13* (2022.01)
*G06F 3/042* (2006.01)

(52) U.S. Cl.
CPC .......... *G06V 40/1306* (2022.01); *G06F 3/042* (2013.01)

(58) Field of Classification Search
CPC .......... G01R 31/2635; G01R 19/16519; G01R 31/2621; G09G 3/006; G09G 3/3233; G09G 2330/01; G09G 3/3241; G09G 3/325
See application file for complete search history.

(56) References Cited

U.S. PATENT DOCUMENTS

| 2014/0009400 A1* | 1/2014 | Poorter | G06F 3/04164 345/173 |
| 2014/0285734 A1* | 9/2014 | Lin | G06F 1/1643 349/12 |

* cited by examiner

*Primary Examiner* — Tung X Nguyen
(74) *Attorney, Agent, or Firm* — Birch, Stewart, Kolasch & Birch, LLP

(57) ABSTRACT

A touch panel with a fingerprint identification function includes a glass substrate, a fingerprint identification chip, and a driving flexible board. The glass substrate has a surface including a touch sensing area and a fingerprint identification area located at different positions. A touch sensing circuit is formed by etching on the touch sensing area. A fingerprint identification circuit is formed by etching on the fingerprint identification area. The surface has at least one driving contact electrically connected to the touch sensing circuit and the fingerprint identification circuit. The fingerprint identification chip has several Au bumps connected to the fingerprint identification circuit, thereby the fingerprint identification chip is engaged with the surface of the glass substrate. The driving flexible board has at least one driving chip and a driving circuit electrically connected to the driving chip. The driving circuit is engaged with the driving contact of the glass substrate.

24 Claims, 6 Drawing Sheets

TOUCH PANEL WITH FINGERPRINT IDENTIFICATION FUNCTION AND MANUFACTURING METHOD THEREOF

BACKGROUND OF THE INVENTION

Technical Field

The present invention relates generally to a touch panel, and more particularly to a touch panel with a fingerprint identification function.

Description of Related Art

Conventional touch modules have been widely used and applied on portable electronic devices such as mobile phones, tablet computers, or notebook computers. Users can quickly and effectively input control commands through the touch module. Additionally, to improve the accuracy of user identification and to improve the security of user identification, fingerprint identification modules have been widely applied on the electronic devices in recent years.

However, in today's technical means, the touch module and the fingerprint identification module are usually two individual modules. For instance, the touch module and the fingerprint identification module are usually designed and manufactured independently and are respectively placed on different operating areas of the notebook computer after the packaging process is respectively completed. Therefore, how to develop a device that could meet the needs of both touch and fingerprint identification has become a major issue in the industry.

BRIEF SUMMARY OF THE INVENTION

In view of the above, the primary objective of the present invention is to provide a fingerprint identification module with a fingerprint identification function, which could simplify the manufacturing process and provide a touch panel with integrated touch and fingerprint recognition functions.

The present invention provides a touch panel with a fingerprint identification function, including a glass substrate, a fingerprint identification chip, and a driving flexible board, wherein the glass substrate has a surface. The surface includes a touch sensing area and a fingerprint identification area located at different positions. A touch sensing circuit is formed by etching on the touch sensing area. A fingerprint identification circuit is formed by etching on the fingerprint identification area. The surface has at least one driving contact electrically connected to the touch sensing circuit and the fingerprint identification circuit. The fingerprint identification chip has a plurality of Au bumps, wherein the Au bumps are connected to the fingerprint identification circuit, thereby engaging the fingerprint identification chip with the surface of the glass substrate. The driving flexible board has at least one driving chip and a driving circuit, wherein the at least one driving chip is electrically connected to the driving circuit, and the driving circuit is engaged with the at least one driving contact of the glass substrate.

The present invention further provides a manufacturing method of a touch panel with a fingerprint identification function, including steps of: provide a glass substrate having a surface, wherein the surface comprises a touch sensing area and a fingerprint identification area located at different positions; form a touch sensing circuit by etching on the touch sensing area, and form a fingerprint identification circuit by etching on the fingerprint identification area, wherein the surface has at least one driving contact electrically connected to the touch sensing circuit and the fingerprint identification circuit; provide a fingerprint identification chip having a plurality of Au bumps, and engage the fingerprint identification chip with the surface of the glass substrate, thereby connecting the Au bumps to the fingerprint identification circuit; provide a driving flexible board, wherein the driving flexible board has at least one driving chip and a driving circuit electrically connected to the at least one driving chip; engage the driving circuit of the driving flexible board with the driving contact of the glass substrate.

With the aforementioned design, the touch sensing area and the fingerprint identification area are located at different positions on the same glass substrate, thereby achieving the integration of touch and fingerprint recognition functions on the same substrate. Additionally, the fingerprint identification chip could be directly engaged with the surface of the glass substrate by connecting the Au bumps of the fingerprint identification chip to the fingerprint identification circuit, thereby the fingerprint identification chip does not need to perform an additional packaging process, simplifying the manufacturing process and reducing the manufacturing cost.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
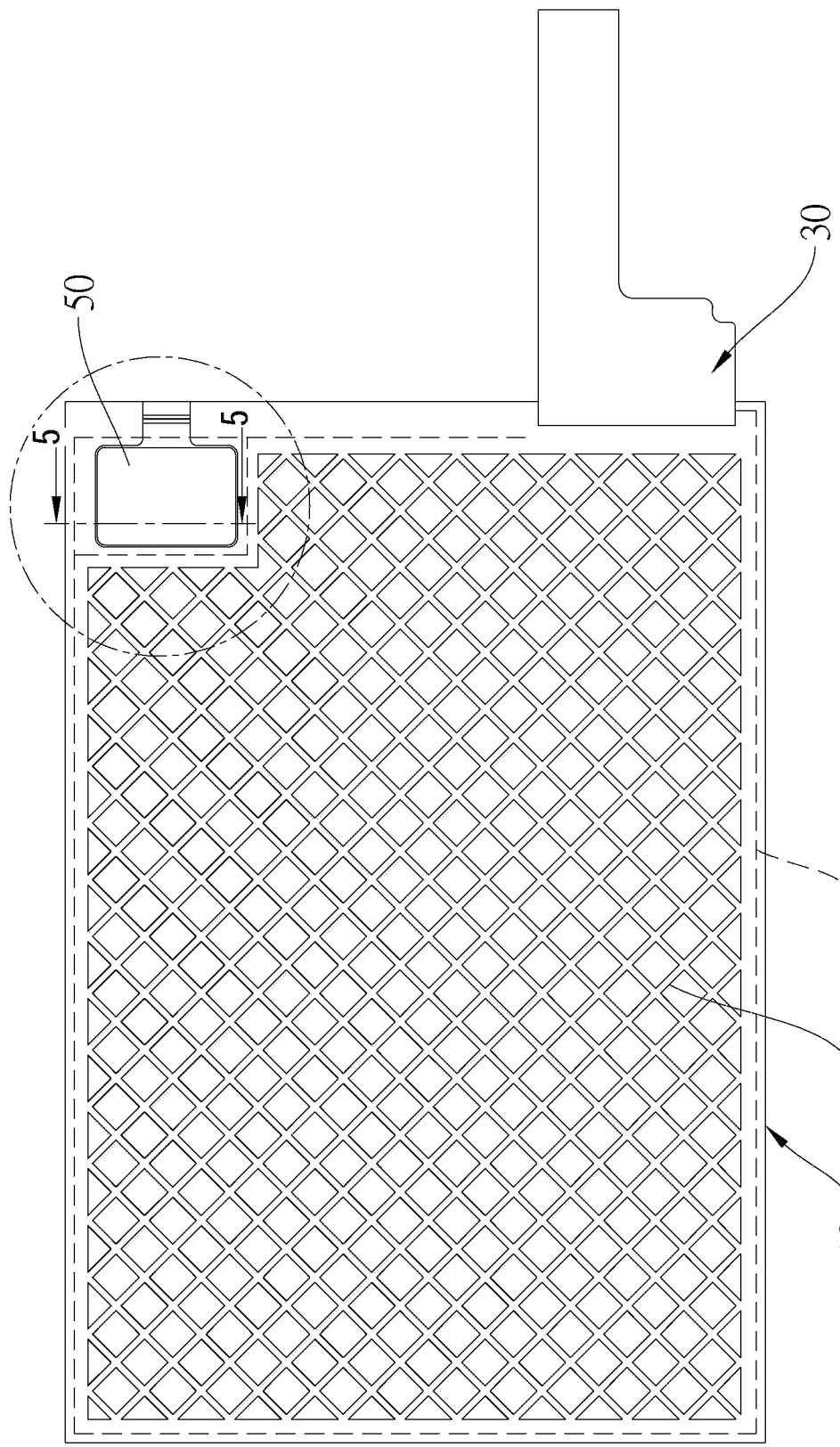
FIG. 1 is a top view of the fingerprint identification module with the fingerprint identification function according to an embodiment of the present invention.
Figure 2:
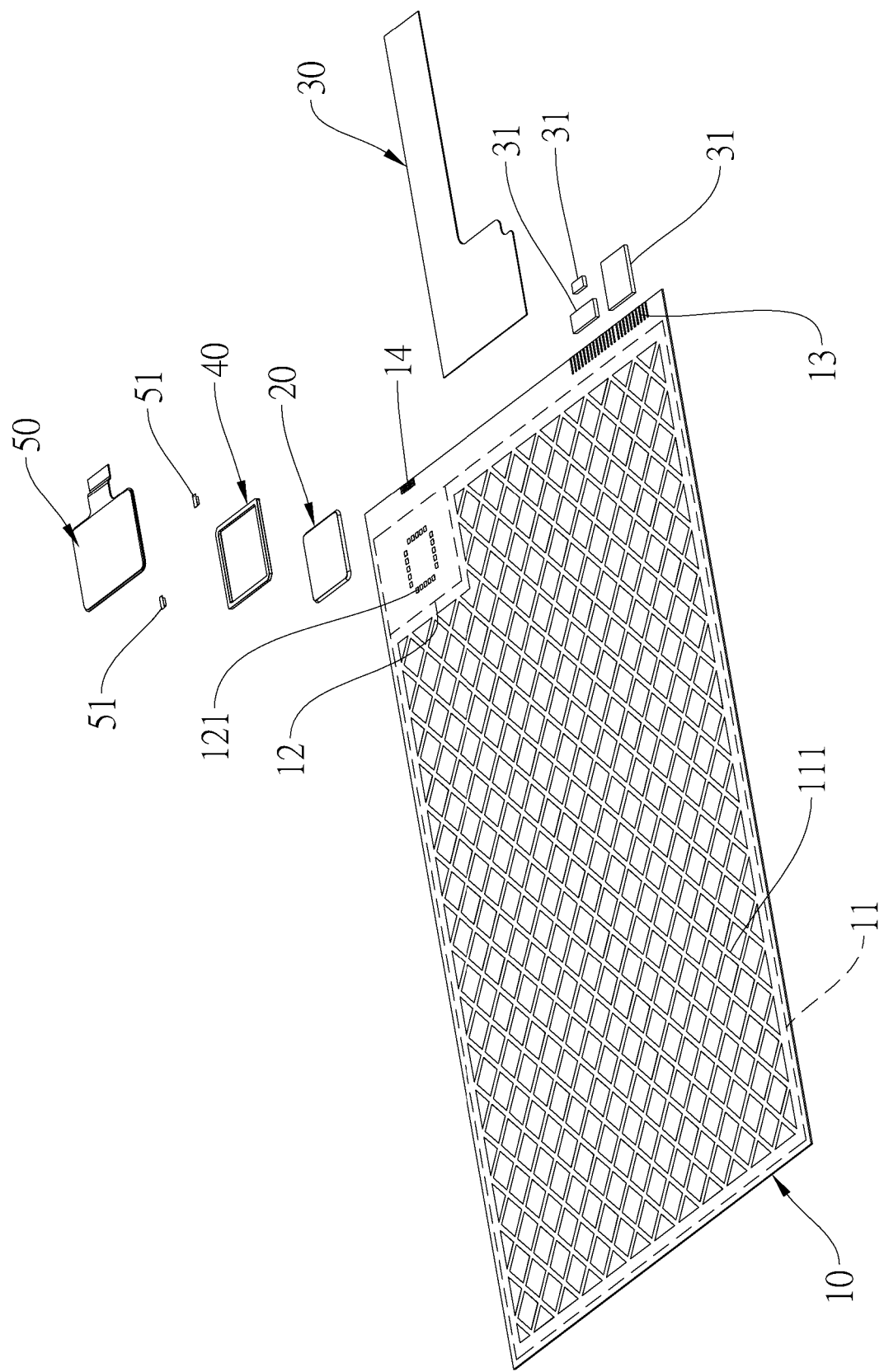
FIG. 2 is a partially exploded view of the fingerprint identification module with the fingerprint identification function according to the embodiment of the present invention.

A touch panel 1 with a fingerprint identification function according to an embodiment of the present invention is illustrated in FIG. 1 to FIG. 5 and includes a glass substrate 10, a fingerprint identification chip 20, and a driving flexible board 30, wherein the fingerprint identification chip 20 could be, for example, a capacitive sensing element which is adapted to sense an intensity of the peak and valley charges of a fingerprint to generate an electronic signal, thereby identifying user information.

The glass substrate 10 has a surface S, wherein the surface S includes a touch sensing area 11 and a fingerprint identification area 12 located at different positions. A touch sensing circuit 111 is formed by etching on the touch sensing area 11, and a fingerprint identification circuit 121 is formed by etching on the fingerprint identification area 12, wherein the surface has at least one driving contact 13 electrically connected to the touch sensing circuit 111 and the fingerprint identification circuit 121.

An area of the touch sensing area 11 is greater than an area of the fingerprint identification area 12, and the fingerprint identification area 12 is located outside of the touch sensing area 11 to prevent the touch sensing area 11 from being mistakenly touched when touching the fingerprint identification area 12, thereby facilitating user's operation. In the current embodiment, the fingerprint identification area 12 is located at a corner of the touch sensing area 11 and substantially forms a rectangular area with the touch sensing area 11.

The touch sensing circuit 111 and the fingerprint identification circuit 121 could be, for example, circuits formed by etching ITO (Indium Tin Oxide).

The driving flexible board 30 has at least one driving chip 31 and a driving circuit electrically connected to the driving chip 31, wherein the driving circuit is engaged with the driving contact 13 of the glass substrate 10. In this way, the driving chip 31 could drive the touch sensing circuit 111 and the fingerprint identification chip 20 to operate through the driving contact 13. A number of the driving chip 31 could be one or more than one. In the current embodiment, the driving flexible board 30 is connected to the driving contact 13 on the glass substrate 10 through ACF (Anisotropic Conductive Film) technology.

In the current embodiment, the fingerprint identification chip 20 is engaged with the glass substrate 10 in Chip-on-Glass (COG) manner. The fingerprint identification chip 20 has a plurality of Au bumps 21 connected to the fingerprint identification circuit 121 to engage the fingerprint identification chip 20 with the surface S of the glass substrate 10. In this way, the fingerprint identification chip 20 does not need to perform an additional packaging process, thereby simplifying the manufacturing process and reducing the manufacturing cost.

In the current embodiment, the fingerprint identification chip 20 is connected to the fingerprint identification circuit 121 via the Au bumps as an example. In other embodiments, the fingerprint identification chip 20 could be connected to the fingerprint identification circuit 121 via, for example, solder bumps, copper bumps, or other similar metal bumps.

Figure 4:
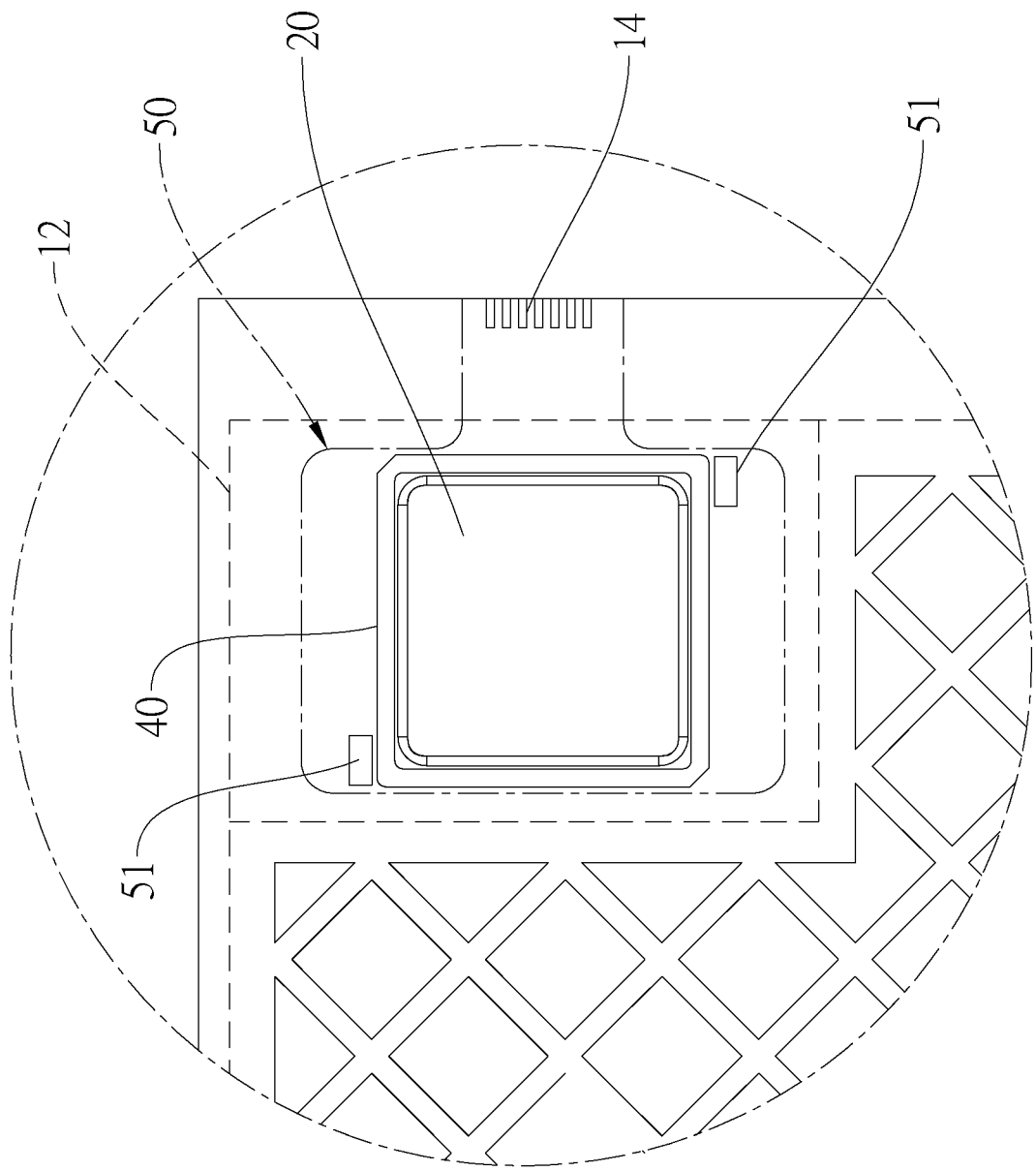
FIG. 4 is a partially enlarged view of a marked region in FIG. 1.
Figure 5:
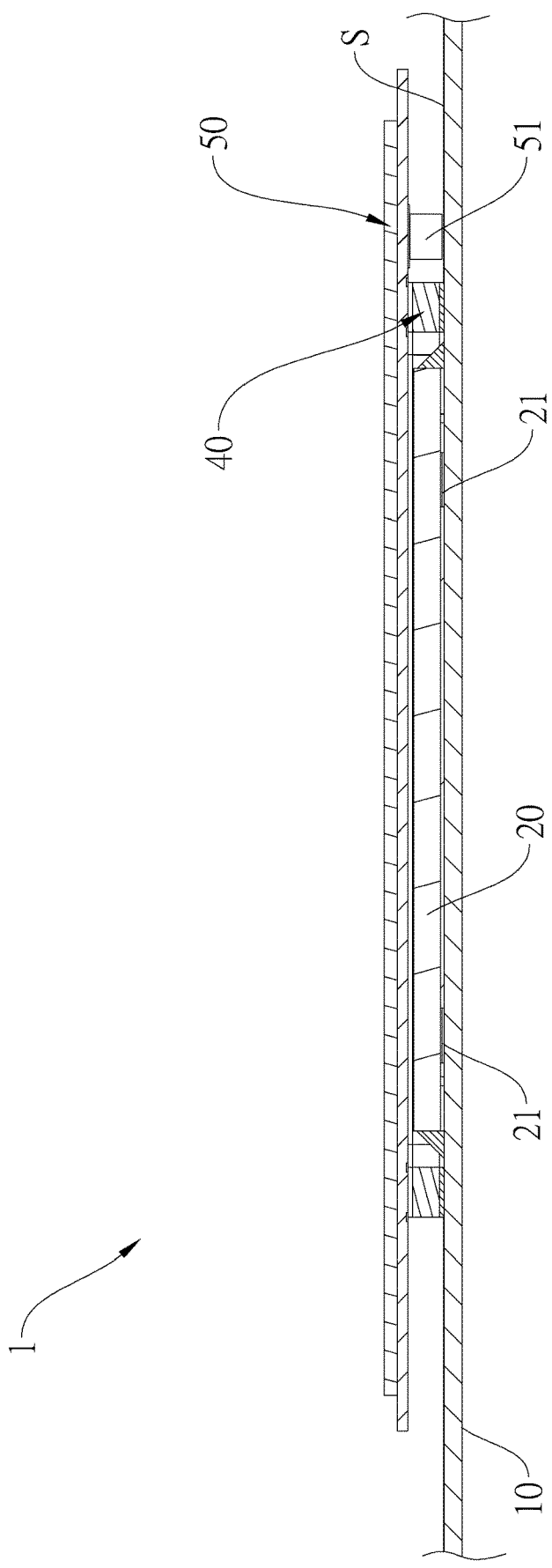
FIG. 5 is a sectional view along the 5-5 line in FIG. 1.

Referring to FIG. 4, in the current embodiment, the touch panel 1 includes two light sources 51 and a light-guiding member 40, wherein the light-guiding member 40 is made of a transparent material and is disposed adjacent to the light sources 51 and is located between the light sources 51 and the fingerprint identification chip 20 and is annular, and the fingerprint identification chip 20 is located in a space surrounded by an inner surface of the light-guiding member 40.

In the current embodiment, the light-guiding member 40 is a square ring and surrounds the fingerprint identification chip 20. In other embodiments, the light-guiding member 40 could be annular in other shapes such as circular, which could also surround the fingerprint identification chip 20 and guide the light emitted by the two light sources to a periphery of the fingerprint identification chip 20 to generate a uniform light ring to indicate a position and a state of the fingerprint identification chip 20.

In the current embodiment, the light sources 51 are LED light sources respectively disposed adjacent to the fingerprint identification chip 20 and located at opposite corners of an outer peripheral surface of the light-guiding member 40.

In other embodiments, a number of the light source 51 could be one or more than two, and the light source 51 could be disposed around the light-guiding member 40, and not limited to the position as exemplified above.

The touch panel 1 includes a sealant disposed around the fingerprint identification chip 20 and located between the glass substrate 10 and the light-guiding member 40. In the current embodiment, the sealant is UV adhesive as an example. In practice, the sealant could be heat-curing glue, light-curing glue, or a combination thereof.

Figure 3:
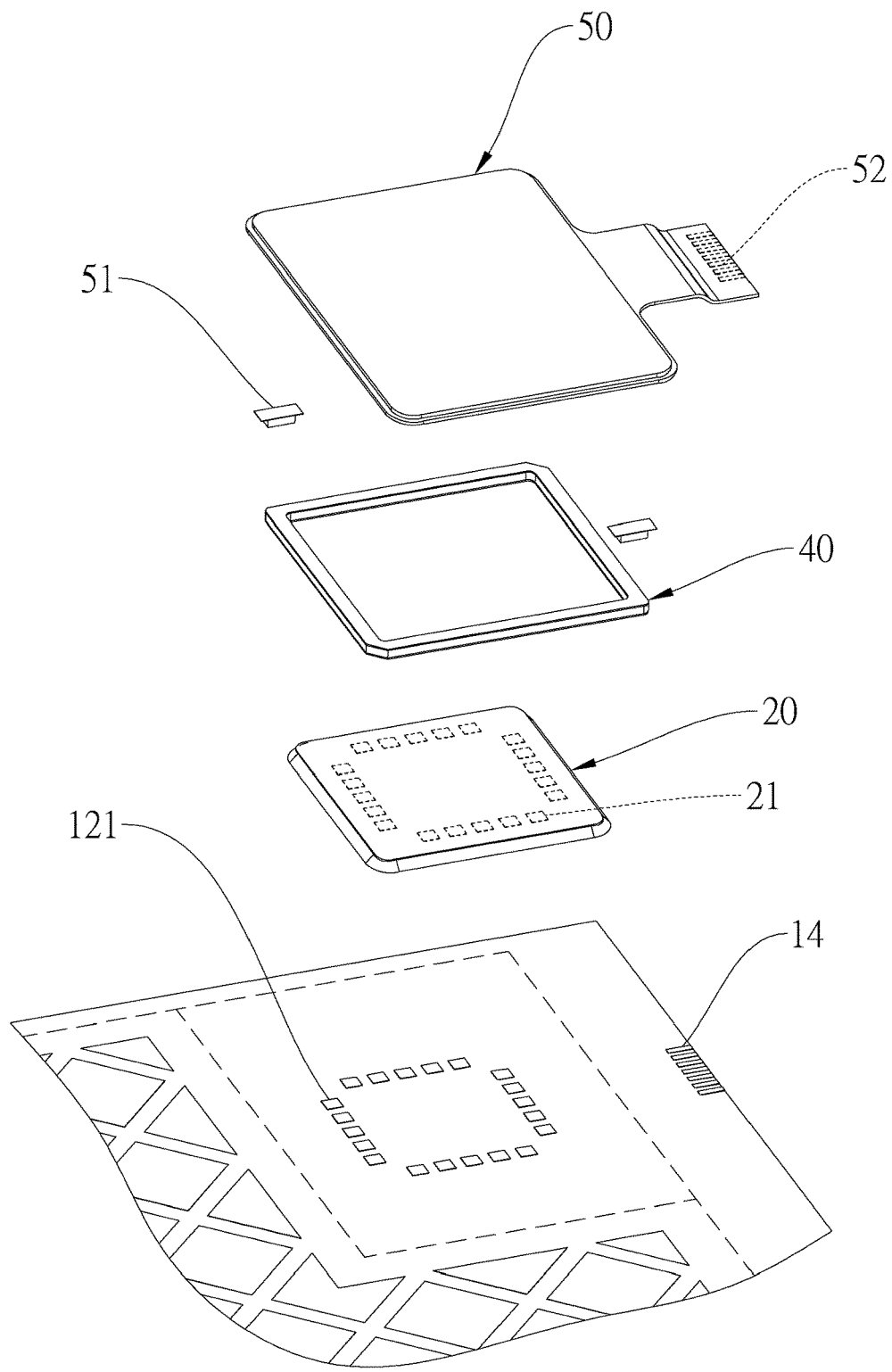
FIG. 3 is a partially enlarged view of the fingerprint identification module with the fingerprint identification function according to the embodiment of the present invention.

The touch panel 1 includes a light source flexible board 50, wherein the light source flexible board 50 has the light sources 51 and a light source circuit 52 as shown in FIG. 3. The light source circuit 52 is electrically connected to the light sources 51. The glass substrate 10 further has a light source contact 14, wherein the light source circuit 52 is engaged with the light source contact 14. The fingerprint identification chip 20 is overlaid with the light source flexible board 50, so that the fingerprint identification chip 20 is located between the glass substrate 10 and the light source flexible board 50. In the current embodiment, the light source flexible board 50 is connected to the light source contact 14 on the glass substrate 10 through ACF (Anisotropic Conductive Film) technology.

Figure 6:
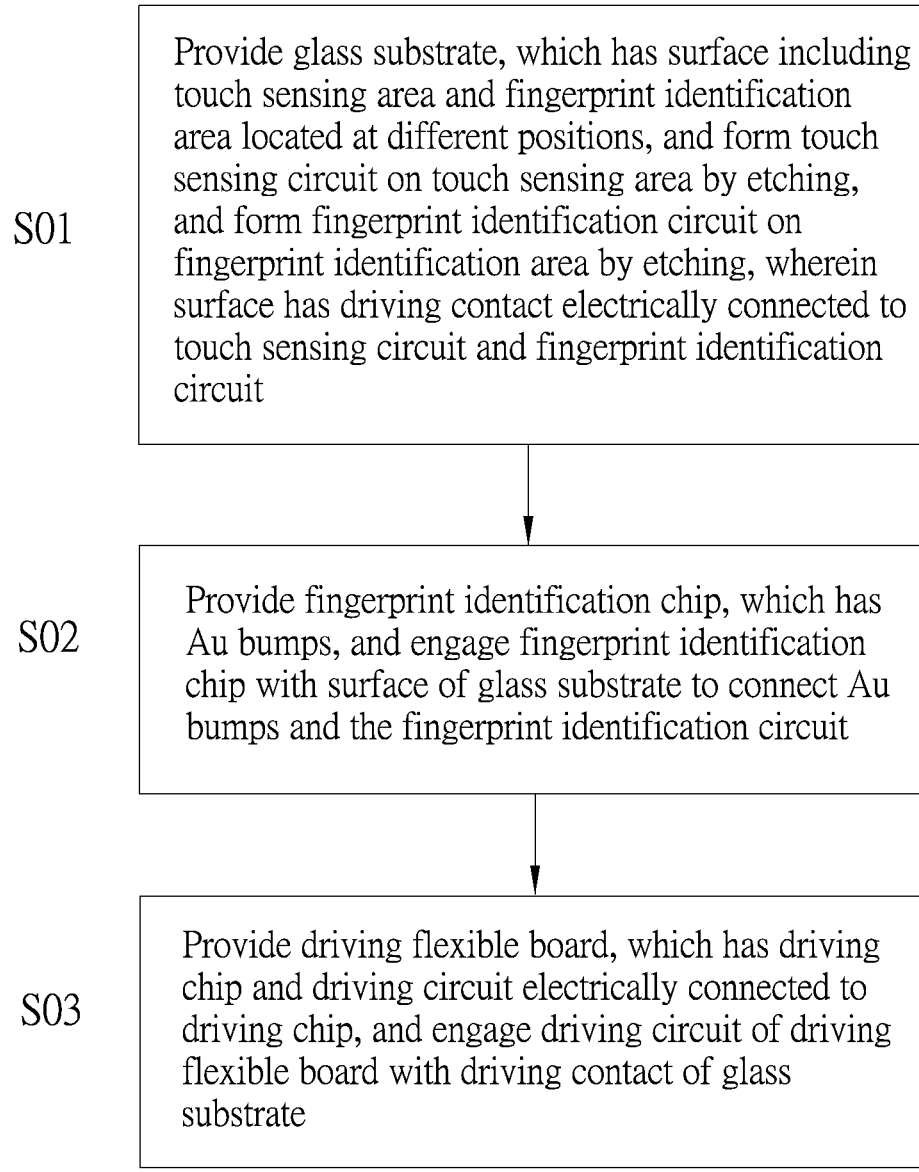
FIG. 6 is a flowchart of the manufacturing method of the fingerprint identification module with the fingerprint identification function according to the embodiment of the present invention.

Referring to FIG. 6, a manufacturing method of the touch panel 1 of the embodiment of the present invention includes the following steps.

Step S01 provide a glass substrate 10, wherein the glass substrate 10 has a surface S including a touch sensing area 11 and a fingerprint identification area 12 located at different positions; a touch sensing circuit 111 is formed by etching on the touch sensing area 11, and a fingerprint identification circuit 121 is formed by etching on the fingerprint identification area 12; the surface S has at least one driving contact 13 electrically connected to the touch sensing circuit 111 and the fingerprint identification circuit 121; the touch sensing area 11 is greater than the fingerprint identification area 12, and the fingerprint identification area 12 is located on the outside the touch sensing area 11.

Step S02, provide a fingerprint identification chip 20, wherein the fingerprint identification chip 20 has a plurality of Au bumps 21; engage the fingerprint identification chip 20 with the surface S of the glass substrate 10, thereby the Au bumps 21 are connected to the fingerprint identification circuit 121.

Step S03, provide a driving flexible board 30, wherein the driving flexible board 30 has at least one driving chip 31 and a driving circuit 32 electrically connected to the driving chip 31; engage the driving circuit 32 of the driving flexible board 30 with the driving contact 13 of the glass substrate 10. In the current embodiment, the driving flexible board 30 is connected to the driving contact 13 of the glass substrate 10 through the ACF (Anisotropic Conductive Film) technology; wherein a sequence of taking step S02 and step S03 is not limited to the above embodiment.

The manufacturing method of the touch panel 1 further includes, providing at least one light source 51 located at a position adjacent to the fingerprint identification chip 20 and providing a light-guiding member 40 made of transparent materials and located at a position adjacent to the light source 51, wherein the light-guiding member 40 is located between the light source 51 and the fingerprint identification chip 20 and surrounds the fingerprint identification chip 20; the light-guiding member 40 is annular, and the fingerprint identification chip 20 is located in a space surrounded by inner surface of the light-guiding member 40; the light source 51 is located on an outer peripheral surface of the light-guiding member 40. In the current embodiment, the at least one light source 51 includes two light sources 51, and the light-guiding member 40 is a square ring, and the two light sources 51 are respectively disposed around the light-guiding member 40 or at opposite corners of the light-guiding member 40.

The manufacturing method of the touch panel 1 further includes, providing a light source flexible board 50, wherein the fingerprint identification chip 20 is overlaid with the light source flexible board 50, thereby the fingerprint identification chip 20 is located between the glass substrate 10 and the light source flexible board 50; the light source flexible board 50 has the light source 51 and a light source circuit 52 electrically connected to the light source 51; the glass substrate 10 further has a light source contact 14, and the light source circuit 52 is engaged with the light source contact 14.

The manufacturing method of the touch panel 1 further includes, providing a sealant around the fingerprint identification chip 20 and located between the glass substrate 10 and the light-guiding member 40.

With the aforementioned design, the touch sensing area 11 and the fingerprint identification area 12 are located at different positions on the same glass substrate 10, thereby achieving the integration of touch and fingerprint recognition functions on the same substrate. Additionally, the fingerprint identification chip 20 could be directly engaged with the surface S of the glass substrate 10 by connecting the Au bumps 21 of the fingerprint identification chip 20 to the fingerprint identification circuit 121, thereby the fingerprint identification chip 20 does not need to perform an additional packaging process, simplifying the manufacturing process and reducing the manufacturing cost.

It must be pointed out that the embodiments described above are only some preferred embodiments of the present invention. All equivalent structures and methods which employ the concepts disclosed in this specification and the appended claims should fall within the scope of the present invention.

What is claimed is:

1. A touch panel with a fingerprint identification function comprising:
   a glass substrate having a surface, wherein the surface comprises a touch sensing area and a fingerprint identification area located at different positions; a touch sensing circuit is formed by etching on the touch sensing area; a fingerprint identification circuit is formed by etching on the fingerprint identification area; the surface has at least one driving contact electrically connected to the touch sensing circuit and the fingerprint identification circuit;
   a fingerprint identification chip having a plurality of Au bumps, wherein the Au bumps are connected to the fingerprint identification circuit, thereby engaging the fingerprint identification chip with the surface of the glass substrate; and
   a driving flexible board having at least one driving chip and a driving circuit, wherein the at least one driving chip is electrically connected to the driving circuit, and the driving circuit is engaged with the at least one driving contact of the glass substrate.

2. The touch panel as claimed in claim 1, further comprising at least one light source disposed at a position adjacent to the fingerprint identification chip.

3. The touch panel as claimed in claim 2, further comprising a light-guiding member which is made of a transparent material and is disposed at a position adjacent to the at least one light source.

4. The touch panel as claimed in claim 3, wherein the light-guiding member is located between the at least one light source and the fingerprint identification chip.

5. The touch panel as claimed in claim 3, wherein the light-guiding member surrounds the fingerprint identification chip.

6. The touch panel as claimed in claim 5, wherein the light-guiding member is annular, and the fingerprint identification chip is located in a space surrounded by an inner surface of the light-guiding member.

7. The touch panel as claimed in claim 6, wherein the at least one light source is located on an outer peripheral surface of the light-guiding member.

8. The touch panel as claimed in claim 7, wherein the at least one light source comprises two light sources; the light-guiding member is a square ring; the two light sources are respectively disposed around the light-guiding member or at opposite corners of the light-guiding member.

9. The touch panel as claimed in claim 2, further comprising a light source flexible board, wherein the light source flexible board has the at least one light source and a light source circuit electrically connected to the at least one light source; the glass substrate further has a light source contact, and the light source circuit is engaged with the light source contact.

10. The touch panel as claimed in claim 9, wherein the fingerprint identification chip is overlaid with the light source flexible board, thereby the fingerprint identification chip is located between the glass substrate and the light source flexible board.

11. The touch panel as claimed in claim 1, wherein the touch sensing area is greater than the fingerprint identification area, and the fingerprint identification area is located outside of the touch sensing area.

12. The touch panel as claimed in claim 3, further comprising a sealant disposed around the fingerprint identification chip and located between the glass substrate and the light-guiding member.

13. A manufacturing method of a touch panel with a fingerprint identification function, comprising:
   providing a glass substrate having a surface, wherein the surface comprises a touch sensing area and a fingerprint identification area located at different positions; forming a touch sensing circuit by etching on the touch sensing area, and forming a fingerprint identification circuit by etching on the fingerprint identification area, wherein the surface has at least one driving contact electrically connected to the touch sensing circuit and the fingerprint identification circuit;
   providing a fingerprint identification chip having a plurality of Au bumps, and engaging the fingerprint identification chip with the surface of the glass substrate, thereby connecting the Au bumps to the fingerprint identification circuit; and
   providing a driving flexible board, wherein the driving flexible board has at least one driving chip and a driving circuit electrically connected to the at least one driving chip;
   engaging the driving circuit of the driving flexible board with the driving contact of the glass substrate.

14. The manufacturing method as claimed in claim 13, further comprising providing at least one light source at a position adjacent to the fingerprint identification chip.

15. The manufacturing method as claimed in claim 14, further comprising providing a light-guiding member which is made of a transparent material and is disposed at a position adjacent to the at least one light source.

16. The manufacturing method as claimed in claim 15, wherein the light-guiding member is located between the at least one light source and the fingerprint identification chip.

17. The manufacturing method as claimed in claim 15, wherein the light-guiding member surrounds the fingerprint identification chip.

18. The manufacturing method as claimed in claim 17, wherein the light-guiding member is annular, and the fingerprint identification chip is located in a space surrounded by an inner surface of the light-guiding member.

19. The manufacturing method as claimed in claim 18, wherein the at least one light source is located on an outer peripheral surface of the light-guiding member.

20. The manufacturing method as claimed in claim 19, wherein the at least one light source comprises two light sources; the light-guiding member is a square ring; the two light sources are respectively disposed around the light-guiding member or at opposite corners of the light-guiding member.

21. The manufacturing method as claimed in claim 14, further comprising providing a light source flexible board, wherein the light source flexible board has the at least one light source and a light source circuit electrically connected to the at least one light source; the glass substrate further has a light source contact, and the light source circuit is engaged with the light source contact.

22. The manufacturing method as claimed in claim 21, further comprising overlaying the fingerprint identification chip with the light source flexible board, thereby the fingerprint identification chip is located between the glass substrate and the light source flexible board.

23. The manufacturing method as claimed in claim 13, wherein the touch sensing area is greater than the fingerprint identification area, and the fingerprint identification area is located outside of the touch sensing area.

24. The manufacturing method as claimed in claim 15, further comprising providing a sealant around the fingerprint identification chip and located between the glass substrate and the light-guiding member.

* * * * *